Dec. 5, 1950  C. B. SHEPPARD  2,532,736
ARRANGEMENT FOR COMPARING ELECTRICAL CHARACTERISTICS
Filed Aug. 21, 1946
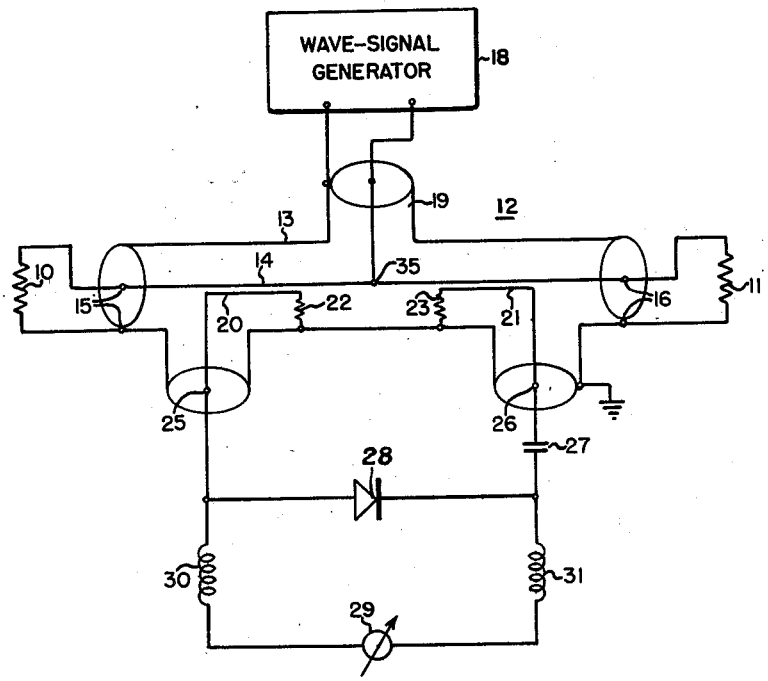
INVENTOR,
CHARLES B. SHEPPARD,
BY
ATTORNEY.

Patented Dec. 5, 1950

2,532,736

UNITED STATES PATENT OFFICE 2,532,736

ARRANGEMENT FOR COMPARING ELECTRICAL CHARACTERISTICS

Charles B. Sheppard, Cheltenham, Pa., assignor to Hazeltine Research, Inc., Chicago, Ill., a corporation of Illinois Application August 21, 1946, Serial No. 692,073

8 Claims. (Cl. 175—183)

1

The present invention relates to arrangements for comparing, at high frequencies, electrical characteristics such as the electrical impedances of two elements.

Heretofore standing-wave measuring apparatus of the slotted-line type has been utilized to determine, at high frequencies, the magnitude and the phase of the impedance of an electrical element. An arrangement of this type is described in detail and claimed in a copending application filed in the name of David Dettinger, Serial No. 573,436, filed January 18, 1945, entitled "Standing-Wave Measuring Apparatus," now U. S. Patent No. 2,454,042, issued November 16, 1948, and assigned to the same assignee as the instant invention. Such arrangements generally comprise a coaxial transmission line having a slotted outer conductor and a centrally disposed inner conductor which interconnect a high frequency signal generator and the impedance to be measured. An adjustable carriage is slidably mounted on the outer conductor and carries a vertically adjustable pickup device which is connected to a vacuum-tube voltmeter. The adjustable carriage co-operates with a scale or scales on the outer conductor in a manner to indicate the position and the amount of movement of the pickup device, while the vaccum-tube voltmeter indicates the magnitude of the voltages coupled to the pickup device at various positions of the carriage along the slotted outer conductor. To determine the characteristic of an unknown impedance, observations of several scale and meter readings, computations making use of this observed data, and the utilization of impedance conversion charts are ordinarily required. Absolute values of impedances are then obtained by this rather laborious procedure. While such arrangements are satisfactory for use in the laboratory by skilled operating personnel, they are generally too difficult to operate and too slow for use in the factory by relatively unskilled individuals for comparing the impedances of mass production items with that of a known standard, particularly when comparisons over a relatively wide range of frequencies are desired.

It is an object of the present invention, therefore, to provide a new and improved arrangement for comparing, at high frequencies, an electrical characteristic of two elements which arrangement avoids one or more of the disadvantages and limitations of prior arrangements of the type described.

It is another object of the invention to provide a new and improved arrangement for comparing, at high frequencies, the electrical characteristics of two impedances, which arrangement may readily be operated by relatively unskilled personnel in a manner to obtain accurate and reliable comparison information.

2

It is a further object of the invention to provide an arrangement for accurately checking, over a relatively wide range of high frequencies, the variation in the impedance of an electrical element from that of a known standard element and at a rate which is faster than heretofore has been possible.

In accordance with a particular form of the invention, an arrangement for comparing at high frequencies electrical characteristics of two elements comprises a wave guide and coupling means by which each of the elements may be coupled to the wave guide at individual ends thereof. The arrangement also includes means for supplying high frequency wave signals to the wave guide, at a point equidistant the ends, to supply high frequency wave signals to the elements. The arrangement additionally includes individual directional coupling means coupled to the wave guide in corresponding relationships between individual ones of the ends and the equidistant point. The individual coupling means are responsive to high frequency wave signals travelling along the wave guide between individual ones of the ends and the equidistant point but only in a predetermined direction with relation to the equidistant point for deriving wave signals having electrical characteristics dependent on the electrical characteristics of the two elements. The arrangement further includes means responsive jointly to the last-mentioned wave signals for obtaining a comparison of the electrical characteristics of the elements.

For a better understanding of the present invention, together with other and further objects thereof, reference is had to the following description taken in connection with the accompanying drawing, and its scope will be pointed out in the appended claims.

Referring now to the drawing, there is illustrated schematically an arrangement embodying the present invention for comparing electrical characteristics. This has particular utility for comparing at high frequencies, the electrical characteristics of two elements 10 and 11, specifically the impedances thereof, and comprises a wave guide 12 of the coaxial transmission-line type. Element 10 preferably is an impedance having a known magnitude and phase characteristic, hence, it will be referred to hereinafter as the standard impedance. Element 11 may comprise a wave-signal antenna, the impedance of which is unknown and is to be compared with, or adjusted to, that of the standard impedance 10. Wave guide 12 includes a main portion comprising an outer conductor 13 and a centrally disposed inner conductor 14. The arrangement also includes coupling means by which each of the impedances 10 and 11 may be coupled to the wave guide 12 at spaced points thereon. This means comprises two pairs of terminals 15, 15 and 16, 16 disposed at opposite ends of the wave guide 12. Preferably the wave guide 12 has a substantially uniform characteristic impedance between its opposite or terminal ends for a purpose to be explained subsequently.

The impedance comparing arrangement also includes means for supplying high frequency wave signal to the wave guide 12, at a point 35 between or intermediate the above-mentioned terminals 15, 15 and 16, 16, in order to supply high frequency wave signals to the impedances 10 and 11. This means comprises a high frequency wave-signal generator 18, which is preferably one that may be adjusted to operate over a relatively wide range of frequencies. Wave-signal generator 18 is connected by an auxiliary portion 19 of the wave guide 12 to the above-mentioned intermediate point 35. Since the two sections of the main portion of the wave guide 12, each of which may be considered to have a characteristic impedance equal to Z, are effectively connected in parallel with each other across the auxiliary portion 19, the latter preferably has a characteristic impedance of Z/2 to afford a proper impedance match at the junction of the two portions. Likewise it is preferable that the generator 18 have a characteristic impedance equal Z/2.

The arrangement of the instant invention also includes directional coupling means coupled to the wave guide 12 between each of the spaced points comprising the first pair of terminals 15, 15 and the second pair of terminals 16, 16 and the intermediate point 35. This directional coupling means is so constructed that it is responsive to high frequency wave signals traveling along the wave guide 12 only in a predetermined direction with relation to the intermediate point 35 for deriving wave-signal energy having electrical characteristics dependent on the electrical characteristics of the two impedances 10 and 11. One of these means comprises a unidirectional coupling loop 20 which is preferably positioned between the junction 35 and one end of the main portion 13, while the other means comprises a similar coupling loop 21 which is located at a corresponding position between the junction 35 and the other end of the main portion 13. Hence, the coupling loops 20 and 21 are mounted in symmetrically disposed positions along the wave guide 12. One end of the coupling loop 20 is connected through a terminating resistor 22 to the inner surface of the outer conductor 13 while the corresponding end of coupling loop 21 is similarly connected to the outer conductor 13 through a terminating resistor 23. Each of the coupling loops 20 and 21 is effectively responsive only to high frequency wave signals translated by the wave guide 12 in a predetermined direction, to be referred to more fully hereinafter. The coupling loops 20 and 21 may be of the type described in detail and claimed in the copending application of Harold A. Wheeler, entitled "Wave-Signal Translating System," Serial No. 670,081, filed May 16, 1946, and assigned to the same assignee as the instant invention. The coupling loops 20 and 21 include output terminals 25 and 26, respectively, for applying wave signals derived by the coupling loops to an output circuit.

The impedance comparing arrangement also includes means responsive jointly to the two wave signals derived by the coupling loops 20 and 21 to obtain a comparison of the electrical characteristics of the impedances 10 and 11. This means comprises a wave-signal rectifier, for example a crystal detector, one terminal of which is connected to the output terminal 25 while the other terminal thereof is connected to the other output terminal 26 through a condenser 27. The direct current path for unidirectional potentials derived by wave-signal rectifier 28 includes the series combination of a meter 29 of conventional construction, and a pair of radio-frequency chokes 30 and 31, the input terminal of each of the latter elements being connected to a different terminal on the wave-signal rectifier 28. The impedances of the coupling loops 20 and 21 and the input terminals of the wave-signal rectifier system are preferably matched to those of the output terminals 25 and 26 so as to avoid undesired wave-signal reflections from any of these terminals. The impedance comparator of the instant invention affords extremely reliable information when the coupling loops 20 and 21, the responsive means including the wave-signal rectifier 28 and meter 29, and the impedances 10 and 11 under comparison are symmetrically disposed with respect to the junction point 35 of the inner conductors of the auxiliary portion 19 and the main portion 13 of the wave guide 12.

Considering now the operation of the above-described impedance-measuring system, it will be initially assumed that the impedance mismatches of impedances 10 and 11 with respect to the transmission line 12 are equal and of the same phase. In accordance with practical design considerations, the impedances of the elements which are being compared, usually do not match that of the wave guide 12 to which they are connected. Since the wave-signal generator 18 is capable of being operated over a relatively wide range of frequencies, it is set at a predetermined frequency and high frequency wave signals are translated to the main portion of wave guide 12 by means of the auxiliary portion 19. These wave signals are translated in different directions from the junction point 35 and are applied to the impedances 10 and 11 by means of the terminals 15, 15 and 16, 16. It is a characteristic of each of the coupling loops 20 and 21 that wave-signal energy, which is coupled thereinto by wave signals traveling in a direction toward the impedances 10 and 11, is dissipated in each of the terminating resistors 22 and 23. Consequently, output signals are not applied to the output terminals 25 and 26 in response to wave signals which are being translated by the wave guide 12 to the terminals 15, 15 and 16, 16. Since the impedance values of the impedances 10 and 11 are mismatched with respect to the main portion of the wave guide 12, wave-signal reflections therefrom are produced at the terminals 15, 15 and 16, 16 and are translated by the wave guide 12 in a direction toward the junction point 35 of the main and auxiliary portions of the wave guide. Wave-signal energy is derived by each of the unidirectional coupling loops 20 and 21 from these reflected wave signals and is applied by the connections to the terminals 25 and 26 to the two terminals of the rectifier 28. Since the electrical lengths of the wave signal paths through corresponding portions of the wave guide 12 and the rectifier 28 of the indicating system are equal, and also because the impedance mismatch of the standard impedance 10 and the unknown impedance 11 with respect to the wave guide 12 are equal, the high frequency wave signals applied to the rectifier 28 are of equal magnitude and phase. Thus a unidirectional output is not produced by the rectifier 28 for application to the meter 29. Consequently, the absence of a reading on the meter 29 indicates that the impedances 10 and 11 are equal in phase and magnitude at this particular frequency. This operation may be repeated for each of several frequencies comprising a range of frequencies by making suitable adjustments of the wave-signal generator 18 and observing the indication on the meter 29. The absence of any reading on the meter 29 will indicate that the unknown impedance 11 equals that of the known impedance 10 over a range of frequencies.

Due to mass production methods, however, some deviation of the impedance of the unknown impedance, for example an antenna, from the known or standard impedance is ordinarily experienced. Assuming now that the unknown impedance 11 is not equal to that of the standard impedance 10 and that both impedances are mismatched with respect to the wave guide 12, the application of wave signals from the generator 18 to the terminals 15, 15 and 16, 16 will produce reflected wave signals from the impedances 10 and 11 of unequal magnitude or phase, or both. Unidirectional coupling loops 20 and 21 will transfer to the output terminals 25, 26 wave signals having different characteristics in response to the reflected wave signals, and the transferred signals will be applied to the rectifier 28. The net high frequency wave signal applied to rectifier 28 will be the vector difference between the wave signals at output terminals 25, 26, and the unidirectional output signal derived by the rectifier will be applied to the meter 29 through the radio-frequency chokes 30 and 31. Meter 29, therefore, indicates the vector difference between the signals applied to the rectifier 28 and, hence, the impedance deviation of the unknown impedance 11 with respect to the standard impedance 10.

It will be manifest that wave-signal generator 18 may be adjusted in a well-known manner to operate at a number of different frequencies and determinations made of the impedance variations of the unknown impedance 11 with respect to the standard impedance 10 at each of those frequencies. Since the high frequency wave-signal paths to the rectifier 28 are symmetrical and equal in length, the arrangement is substantially nonfrequency selective over a relatively wide range of high frequencies. It will also be apparent that meter 29 may be calibrated in terms of impedance variations, so that an unknown impedance 11 may be discarded as unsatisfactory or corrected by suitable adjustment thereof when its impedance value does not fall within certain prescribed limits.

From the foregoing explanation of the operation of the invention, it will be understood that the wave signals to be applied to the wave-signal rectifier desirably comprise only those signals which are reflected from the impedances 10 and 11 which are being compared. Accordingly, it is preferable that the main body portion of the wave guide 12 have a uniform impedance throughout its length to avoid any undesired reflections from discontinuities therein.

It will be apparent from the foregoing description that the impedance comparator of the instant invention is particularly adapted for use in making quick and accurate checks on the variations of an unknown impedance from a standard impedance over a relatively wide range of frequencies.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An arrangement for comparing, at high frequencies, electrical characteristics of two elements comprising: a wave guide; coupling means by which said elements may be coupled to said wave guide at spaced points thereon; means for supplying high frequency wave signals to said wave guide, at a point equidistant said spaced points, to supply high frequency wave signals to said elements; individual directional coupling means coupled to said wave guide in corresponding relationships between individual ones of said spaced points and said equidistant point and responsive to reflected high frequency wave signals traveling along said wave guide between individual ones of said spaced points and said equidistant point but only in a direction away from said first-mentioned coupling means for deriving wave signals having electrical characteristics dependent on said electrical characteristics of said two elements; and means responsive jointly to said last-mentioned wave signals for obtaining a comparison of said electrical characteristics of said elements.

2. An arrangement for comparing, at high frequencies, electrical characteristics of two elements comprising: a wave guide; coupling means by which said elements may be coupled to said wave guide at spaced points thereon; said wave guide having a substantially uniform characteristic impedance between said spaced points to minimize undesirable high frequency wave-signal reflections between said spaced points; means for supplying high frequency wave signals to said wave guide, at a point equidistant said spaced points, to supply high frequency wave signals to said elements; individual directional coupling means coupled to said wave guide in corresponding relationships between said spaced points and said equidistant point and responsive to high frequency wave signals traveling along said wave guide between individual ones of said spaced points and said equidistant point but only in a predetermined direction with relation to said equidistant point for deriving wave signals having electrical characteristics dependent on said electrical characteristics of said two elements; and means responsive jointly to said last-mentioned wave signals for obtaining a comparison of said electrical characteristics of said elements.

3. An arrangement for comparing, at high frequencies, electrical characteristics of two elements comprising: a wave guide; coupling means by which said elements may be coupled to said wave guide at individual ends thereof; means for supplying high frequency wave signals to said wave guide, at a point equidistant said ends, to supply high frequency wave signals to said elements; individual directional coupling means coupled to said wave guide in corresponding relationships between individual ones of said ends and said equidistant point and responsive to high frequency wave signals traveling along said wave guide between individual ones of said ends and said equidistant point but only in a predetermined direction with relation to said equidistant point for deriving wave signals having electrical characteristics dependent on said electrical characteristics of said two elements; and means responsive jointly to said last-mentioned wave signals for obtaining a comparison of said electrical characteristics of said elements.

4. An arrangement for comparing, at high frequencies, electrical characteristics of two elements comprising: a wave guide; coupling means by which said elements may be coupled to said wave guide at spaced points thereon; means for supplying high frequency wave signals to said wave guide, at a point intermediate said spaced points, to supply high frequency wave signals to said elements; individual directional coupling means coupled to said wave guide between individual ones of said spaced points and said intermediate point and responsive to high frequency wave signals traveling along said wave guide between individual ones of said spaced points and said intermediate point only in a predetermined direction with relation to said intermediate point for deriving wave signals having electrical characteristics dependent on said electrical characteristics of said two elements; means responsive jointly to said last-mentioned wave signals for obtaining a comparison of said electrical characteristics of said elements; said spaced points, said individual directional coupling means, and said responsive means being symmetrically disposed electrically with respect to said intermediate point.

5. An arrangement for comparing, over a relatively wide range of high frequencies, electrical impedances of two elements comprising: a wave guide; coupling means by which said elements may be coupled to said wave guide at spaced points thereon; means for supplying high frequency wave signals to said wave guide, at a point intermediate said spaced points, to supply high frequency wave signals to said elements; individual directional coupling means coupled to said wave guide in corresponding relationships between individual ones of said spaced points and said intermediate point and responsive to high frequency wave signals traveling along said wave guide between individual ones of said spaced points and said intermediate point only in a predetermined direction with relation to said intermediate point for deriving wave signals having electrical characteristics dependent on said electrical characteristics of said two elements; and substantially nonfrequency selective means responsive jointly to said last-mentioned wave signals for indicating the vector difference between said impedances.

6. An arrangement for comparing, at high frequencies, electrical characteristics of two elements comprising: a wave guide including a main portion having two ends and having a characteristic impedance equal to Z and including an auxiliary portion having a characteristic impedance equal to Z/2 symmetrically disposed intermediate said two ends of said main portion; coupling means by which said individual ones of said elements may be coupled to said individual ones of said two ends of said main portion; means for supplying high frequency wave signals to said auxiliary portion to supply high frequency wave signals to said elements; unidirectional coupling means individually coupled to said wave guide at each of two positions symmetrically disposed between said auxiliary portion and each of said ends of said main portion and responsive to high frequency wave signals traveling along said wave guide between individual ones of said ends and said auxiliary portion but only in a predetermined direction with relation to said auxiliary portion for deriving wave signals having electrical characteristics dependent on said electrical characteristics of said two elements; and means responsive jointly to said last-mentioned wave signals for obtaining a comparison of said electrical characteristics of said elements.

7. An arrangement for comparing, at high frequencies, electrical characteristics of two elements comprising: a wave-guide system having two guide portions; coupling means by which individual ones of said elements may be coupled to individual ones of said wave-guide portions; means equidistant said coupling means for supplying high frequency wave-signal energy through individual ones of said wave-guide portions to individual ones of said elements; individual directional coupling means coupled to each of said wave-guide portions in corresponding relationships and responsive to high frequency wave-signal energy traveling therethrough between individual ones of said coupling means and said supply means but only in a predetermined direction with relation to said supply means for deriving wave-signals having electrical characteristics dependent on said electrical characteristics of said two elements; and means responsive jointly to said derived last-mentioned wave signals for obtaining a comparison of said electrical characteristics of said elements.

8. An arrangement for comparing, at high frequencies, electrical characteristics of two elements comprising: a wave-guide system having two guide portions; coupling means by which individual ones of said elements may be coupled to individual ones of said wave-guide portions; means equidistant said coupling means for supplying high frequency wave-signal energy through individual ones of said wave-guide portions to individual ones of said elements; a pair of directional coupling means individually coupled to individual ones of said wave-guide portions in corresponding relationships and responsive to high frequency wave-signal energy traveling therethrough between individual ones of said coupling means and said supply means but only in a predetermined direction with relation to said supply means for deriving wave signals having electrical characteristics dependent on said electrical characteristics of said two elements; and means responsive jointly to said derived last-mentioned wave signals for obtaining a comparison of said electrical characteristics of said elements.

CHARLES B. SHEPPARD.

REFERENCES CITED

The following references are of record in the file of this patent:

UNITED STATES PATENTS

| Number | Name | Date |
|---|---|---|
| 2,422,601 | Tashjian | June 17, 1947 |
| 2,423,416 | Sontheimer et al. | July 1, 1947 |
| 2,425,084 | Cork et al. | Aug. 5, 1947 |